(No Model.)

J. C. BRANDON.
MACHINE FOR DRESSING MOLDINGS.

No. 295,726. Patented Mar. 25, 1884.

WITNESSES
John T. Morrow,
J. J. Sheehy.

INVENTOR
John C. Brandon
by Anderson & Smith
his Attorneys

UNITED STATES PATENT OFFICE.

JOHN CLARK BRANDON, OF DETROIT, MICHIGAN.

MACHINE FOR DRESSING MOLDINGS.

SPECIFICATION forming part of Letters Patent No. 295,726, dated March 25, 1884.

Application filed December 15, 1883. (No model.)

*To all whom it may concern:*

Be it known that I, JOHN C. BRANDON, a citizen of the United States, residing at Detroit, in the county of Wayne and State of Michigan, have invented certain new and useful Improvements in Machines for Cutting Out Moldings; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
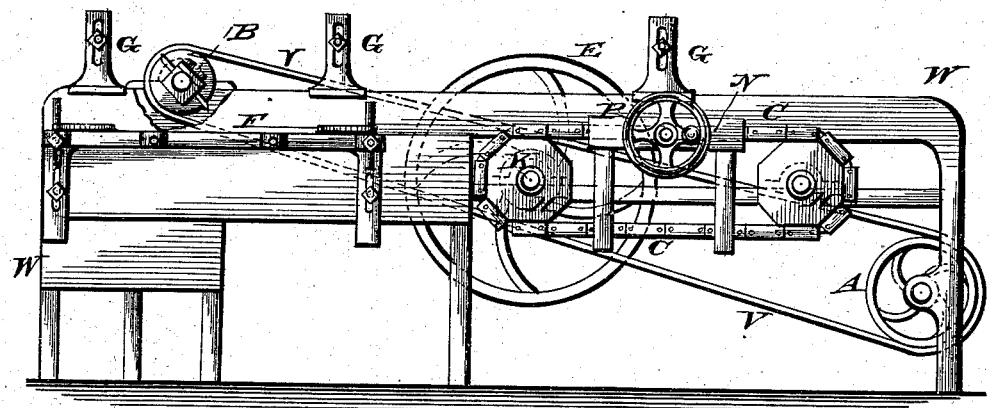
Figure 2:
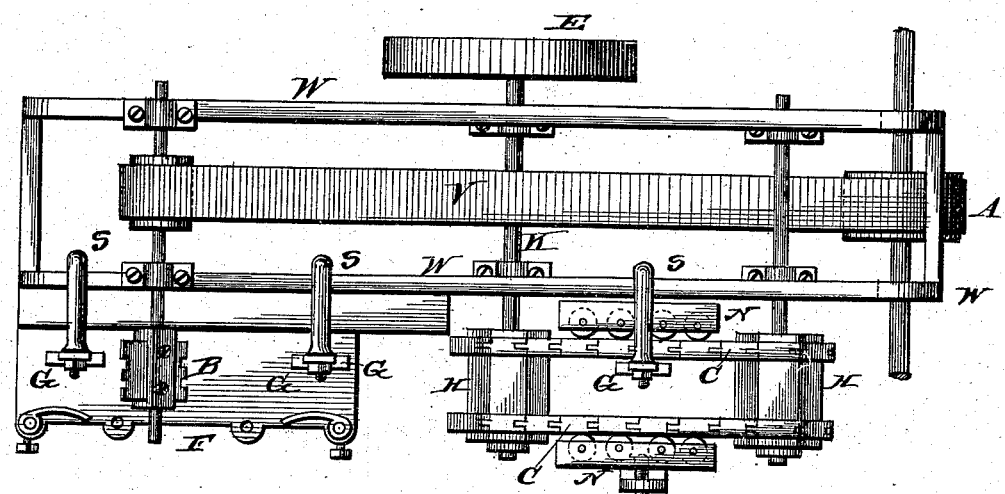
Figure 3:

Figure 1 of the drawings is a representation of a side view of this invention. Fig. 2 is a plan view. Fig. 3 is a sectional view of molding before cutting.

This invention has relation to improvements in machines for dressing and forming moldings; and it consists in the construction and novel arrangement, in combination with a rotary knife or cutter, of a chain feed, all as hereinafter set forth.

The object of this invention is to facilitate dressing and forming moldings, and to prevent marring the delicate face, which is generally prepared with plaster-of-paris.

In the accompanying drawings, the letter W designates the frame-work of the machine.

B represents the cutter-head, and A the driving-pulley, which is joined to the shaft of the cutter-head by the belt V.

F indicates the adjustable table or bed under the cutter-head, over which the work is fed.

G G are vertical slotted clamp bars or bearings, which are adjustable with reference to the standards S, to which they are connected, and which extend over the table F. By means of these clamp-bars the molding is kept steady on the table as it moves along under the knife.

C C represent the endless feed-chain, which moves on the octagonal or prismatic rollers H, one of said rollers being secured on the driving-shaft K, which is provided with the driving-pulley E. These chains consist of rigid links joined together, and they are designed to clasp the molding laid between them by lateral pressure, and as the rollers are turned the chains move and feed the moldings under the knife. The chains are run between roller-bearings N N, one of which is adjustable by means of the hand-wheel screw P, as described in Letters Patent granted to me on the 15th of October, 1874.

After the molding is prepared with whiting, it is turned face downward, and is run through the machine described, to dress the moldings and form them, by taking off the back and lateral edges.

By using this machine I am enabled to form and dress moldings with great rapidity. The blanks are made with less waste than in the old style, being flatter, and having the members of the prepared face more on a level, so that when it is turned face down on the table it will be steady. The back is then cut out by the knife, which takes out the center and cuts off the sides in such a manner as to leave the strips in finished form, as indicated in the drawings by dotted lines in the cross-section of the molding strip or blank.

Having described this invention, what I claim, and desire to secure by Letters Patent, is—

In a machine for dressing and forming moldings, the main frame W, the slotted standards G, the laterally arranged and adjustable endless-chain feeding device, the lateral vertically-adjustable table F, the rotary cutters or knives B, arranged above the said adjustable table, and mechanism for operating the machine, substantially as shown and described.

In testimony whereof I affix my signature in presence of two witnesses.

JOHN CLARK BRANDON.

Witnesses:
JOHN JOSEPH DICK,
DESIRE B. WILLEMIN.